(12) United States Patent
Nakhla (10) Patent No.: US 12,472,852 B2
(45) Date of Patent: Nov. 18, 2025

(54) CHILD RESTRAINT

(71) Applicant: Dorel Juvenile Group, Inc., Foxboro, MA (US)

(72) Inventor: Said S. Nakhla, Daphne, AL (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 117 days.

(21) Appl. No.: 18/512,753

(22) Filed: Nov. 17, 2023

(65) Prior Publication Data

US 2024/0166097 A1    May 23, 2024

Related U.S. Application Data (60) Provisional application No. 63/426,057, filed on Nov. 17, 2022.

(51) Int. Cl.
*B60N 2/28* (2006.01)

(52) U.S. Cl.
CPC ......... *B60N 2/2806* (2013.01); *B60N 2/2812* (2013.01); *B60N 2/2821* (2013.01); *B60N 2/2827* (2013.01); *B60N 2/2857* (2013.01); *B60N 2/2869* (2013.01)

(58) Field of Classification Search
CPC .. B60N 2/2821; B60N 2/2857; B60N 2/2869; B60N 2/143; B60N 2/2827; B60N 2/2875
See application file for complete search history.

(56) References Cited

U.S. PATENT DOCUMENTS

| | | | | |
|---|---|---|---|---|
| 6,739,661 | B1 * | 5/2004 | Dukes | B60N 2/286 297/256.13 |
| 7,338,122 | B2 * | 3/2008 | Hei | B60N 2/2821 297/256.12 |
| 7,819,472 | B2 * | 10/2010 | Hutchinson | B60N 2/2821 297/256.16 |
| 7,857,386 | B2 * | 12/2010 | Van der Vegt | B60N 2/286 297/256.13 |
| 8,474,907 | B2 * | 7/2013 | Weber | B60N 2/2851 297/256.16 |
| 10,011,199 | B2 * | 7/2018 | Clement | B60N 2/2821 |
| 10,737,593 | B1 * | 8/2020 | Shellenberger | B60N 2/2845 |
| 11,440,446 | B2 * | 9/2022 | Ma | B60N 2/2857 |
| 11,752,904 | B2 * | 9/2023 | Li | B60N 2/2806 297/256.12 |
| 12,122,269 | B2 * | 10/2024 | Mchugh | B60N 2/2863 |
| 12,246,629 | B2 * | 3/2025 | Frank | B60N 2/2824 |
| 12,296,726 | B2 * | 5/2025 | McHugh | B60N 2/2821 |
| 2021/0370817 | A1 * | 12/2021 | Belloso Linacisoro | B60N 2/2821 |
| 2024/0101002 | A1 * | 3/2024 | Zhao | B60N 2/26 |
| 2024/0239248 | A1 * | 7/2024 | Saucier | B60N 2/2821 |

(Continued)

FOREIGN PATENT DOCUMENTS

| | | | | |
|---|---|---|---|---|
| CN | 108045279 | A * | 5/2018 | B60N 2/2821 |
| CN | 110126690 | A * | 8/2019 | B60N 2/806 |

(Continued)

*Primary Examiner* — Timothy J Brindley
(74) *Attorney, Agent, or Firm* — Barnes & Thornburg LLP (57) ABSTRACT

A child restraint comprising an outer seat-support shell adapted to rest on a vehicle seat and to be secured to the vehicle seat for transportation in a vehicle and an inner juvenile seat coupled to the outer seat-support shell. The inner juvenile seat is configured to provide a child-receiving space sized to receive a child therein.

19 Claims, 7 Drawing Sheets

(56) References Cited

U.S. PATENT DOCUMENTS

2024/0375562 A1\* 11/2024 Zhang .................... B60N 2/919
2025/0074270 A1\* 3/2025 Carine ................. B60N 2/2821

FOREIGN PATENT DOCUMENTS

| CN | 111055736 A | \* | 4/2020 | ........... B60N 2/2821 |
| CN | 111319529 A | \* | 6/2020 | ........... B60N 2/2821 |
| EP | 1591305 A2 | \* | 11/2005 | ........... B60N 2/2887 |
| EP | 1953035 A2 | \* | 8/2008 | ........... B60N 2/2875 |
| EP | 2574496 A1 | \* | 4/2013 | ........... B60N 2/2851 |
| GB | 2516351 A | \* | 1/2015 | ........... B60N 2/2887 |

\* cited by examiner

CHILD RESTRAINT

PRIORITY CLAIM

This application claims priority under 35 U.S.C. § 119(e) to U.S. Provisional Application Ser. No. 63/426,057, filed Nov. 17, 2022, which is expressly incorporated by reference herein in its entirety.

BACKGROUND

The present disclosure relates to a child restraint, and particularly to a child restraint including a juvenile seat. More particularly, the present disclosure relates to child restraint including a juvenile seat that is configured to be secured to a vehicle seat for transportation in the vehicle.

SUMMARY

According to the present disclosure, a child restraint is adapted to be secured to a vehicle seat. The child restraint includes a seat-support shell and an inner juvenile seat supported by the seat-support shell. The outer seat-support shell is adapted to rest on the vehicle seat and to be secured to the vehicle seat for transportation in a vehicle. The outer seat-support shell is formed to include a seat receiving space which receives at least a portion of the inner juvenile seat. The inner juvenile seat is at least partially received in the seat receiving space and is configured to provide a child-receiving space sized to receive a child therein. The inner juvenile seat is coupled to the outer seat-support shell so as to be supported in spaced apart relation to the vehicle seat and is configured to move selectively relative to the outer seat-support shell to change a recline orientation of the inner juvenile seat relative to the outer seat-support shell.

In illustrative embodiments, the outer seat-support shell includes a shell bottom and a shell back arranged to extend upwardly away from the shell bottom. The child restraint is movable from a forward-facing arrangement to a rearward-facing arrangement. In the forward-facing arrangement, the shell bottom rests on a seat cushion of the vehicle seat. In the rearward-facing arrangement, the shell back rests on the seat cushion of the vehicle seat.

In illustrative embodiments, the shell back includes a fixed back frame and a juvenile-seat brace mounted to an upper end of the fixed back frame for pivotable movement about a horizontal pivot axis between a first seat-support position and a second seat-support position. An upper end of the juvenile-seat brace is spaced apart from the juvenile seat in the first seat-support position when the child restraint is in the forward-facing arrangement. The upper end of the juvenile-seat brace engages the juvenile seat in the second seat support position when the child restraint is in the rearward-facing arrangement.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figures 1, 2:
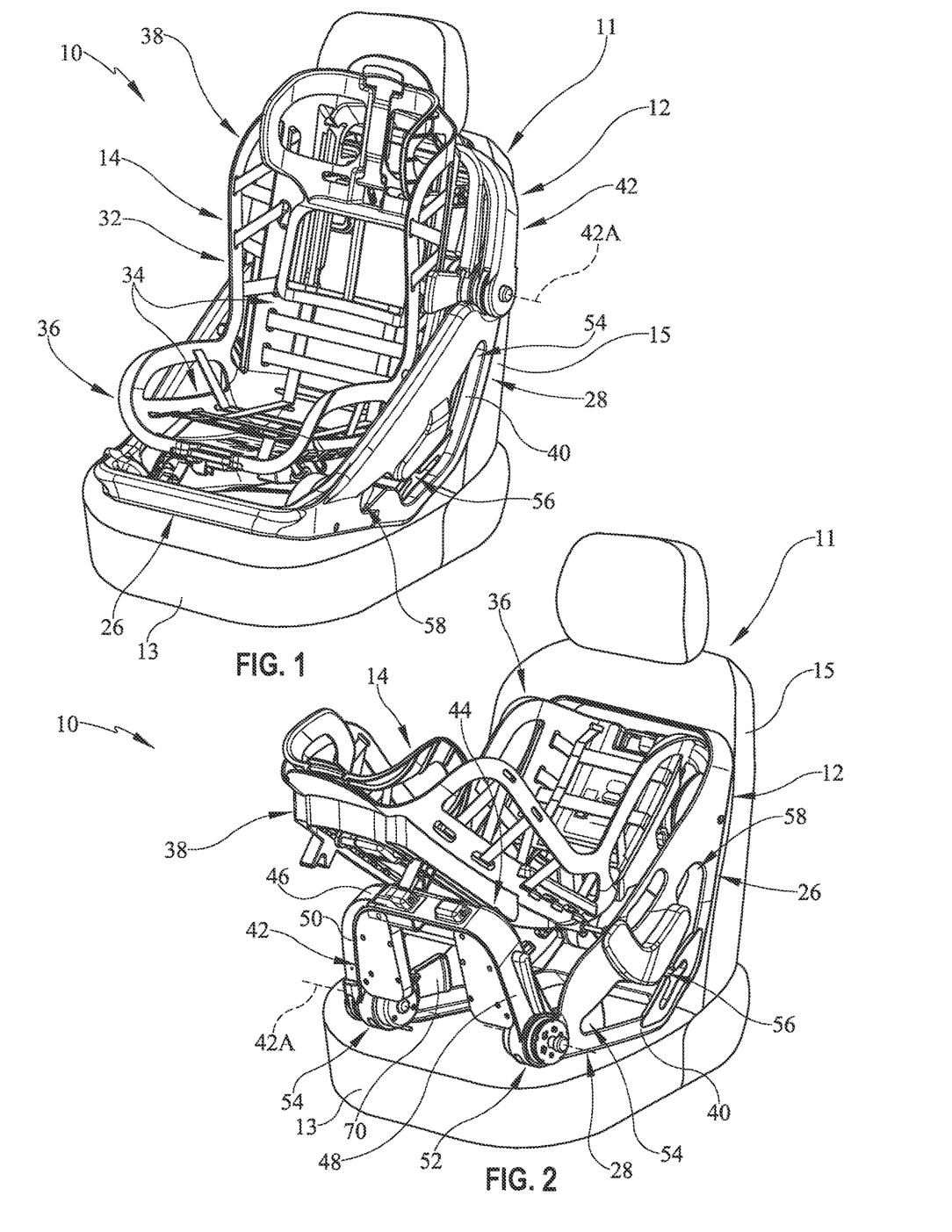
FIG. 1 is a perspective view of a child restraint, in accordance with the present disclosure, including an outer seat-support shell configured to rest on a vehicle seat and to be secured to the vehicle seat and an inner juvenile seat coupled to the outer seat-support shell and configured to support a child for transportation in the vehicle in either a forward-facing arrangement, as shown in FIG. 1, or a rearward-facing arrangement, as shown in FIG. 2.
FIG. 2 is a perspective view of the child restraint from FIG. 1 showing the child restraint arranged in the rearward-facing arrangement and showing that the outer seat-support shell includes a shell bottom and a shell back having a fixed back frame and a juvenile-seat brace coupled to an upper end of the fixed back frame and configured to pivot about a horizontal pivot axis between a first seat-support position as shown in FIG. 1 and a second seat-support position, as shown in FIG. 2 in which the juvenile-seat brace extends towards and engages a seat back of the juvenile seat to support the juvenile seat in the rearward-facing arrangement.

A child restraint 10 is adapted to be secured to a vehicle seat 11 is shown in FIG. 1. The child restraint 10 includes an outer, seat-support shell 12 and an inner juvenile seat 14 supported by the seat-support shell 12. The outer seat-support shell 12 is adapted to rest on the vehicle seat 11 and to be secured to the vehicle seat 11 for transportation in a vehicle. The outer seat-support shell 12 is formed to include a seat receiving space 16 which receives at least a portion of the inner juvenile seat 14. The inner juvenile seat 14 is at least partially received in the seat receiving space 16 and is formed to include a child-receiving space 18 sized to receive a child therein. The inner juvenile seat 14 is coupled to the outer seat-support shell 12 so as to be supported in spaced apart relation to the vehicle seat 11 and is configured to move selectively relative to the outer seat-support shell 12 to change a recline orientation of the inner juvenile seat 14 relative to the outer seat-support shell 12.

Figure 3:
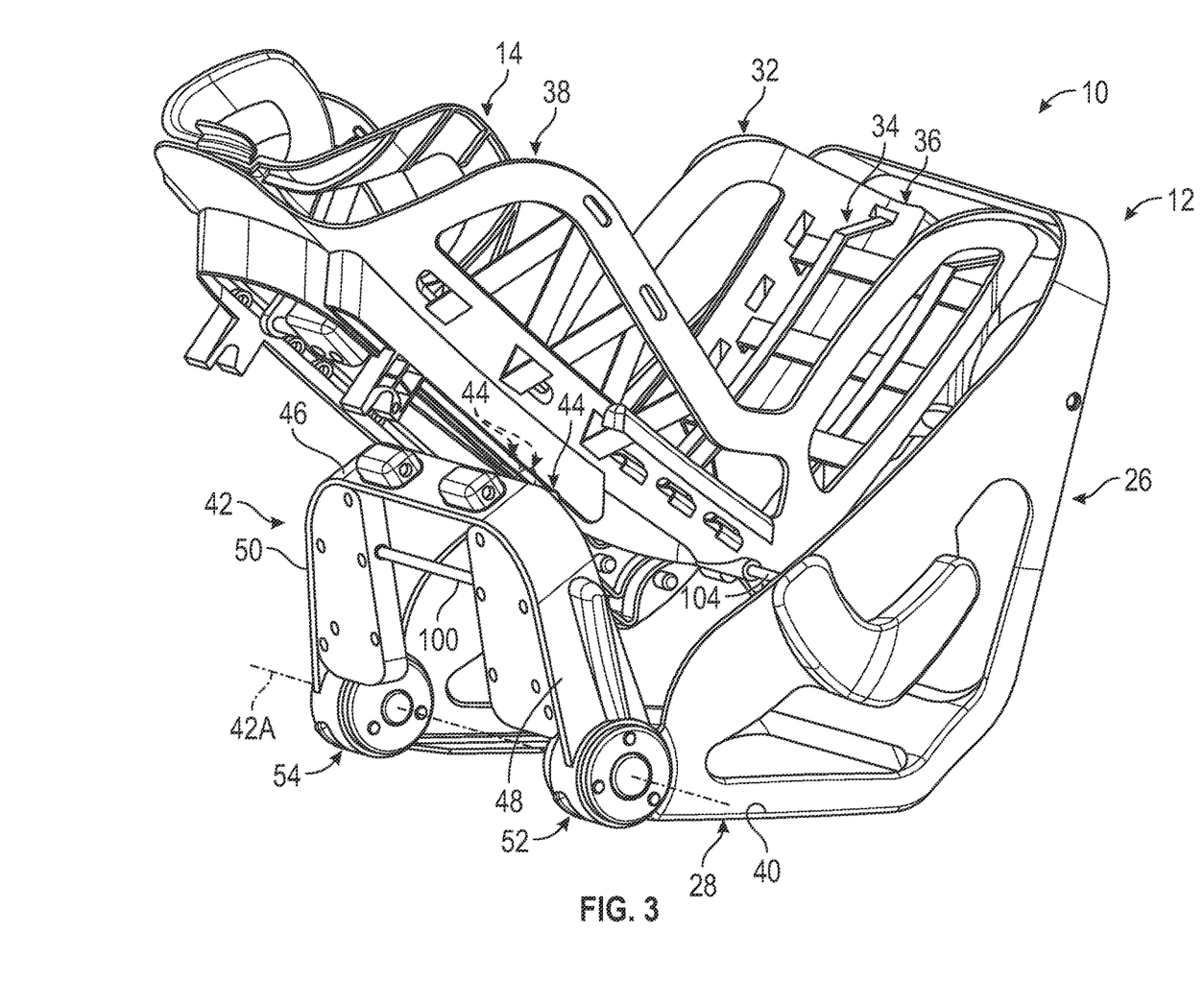
FIG. 3 is an enlarged view of child restraint in the rearward-facing arrangement showing that the juvenile-seat brace includes a top frame beam, a pair of side frame beams, and a pair of hinge locks interconnecting the fixed back frame and the side frame beams.

The seat-support shell 12 includes a shell bottom 26, a shell back 28 arranged to extend upwardly away from the shell bottom 26, and a pair of opposing side rails 27, 29 extending between the shell bottom 26 and the shell back 28 as shown in FIGS. 1-3. The shell bottom 26, the shell back 28, and the side rails 27, 29 are each formed from a rigid material such as a metal or a rigid plastic to provide structural support for the rest of the child restraint 10. The shell bottom 26, the shell back 28, and the side rails 27, 29 cooperate to provide a seat belt path 30 which is sized to receive a vehicle seat belt to secure the child restraint 10 to the vehicle seat 11. Once installed on the vehicle seat 11, the vehicle seat belt is located beneath and/or behind the inner juvenile seat 14 so that the juvenile seat 14 is free to recline relative to the seat-support shell 12 without interference with the vehicle seat belt.

The inner juvenile seat 14 includes a seat chassis 32 coupled to the plurality of harness anchors 22 and an occupant-support pad 34 coupled to the seat chassis 32 and configured to support the child as shown in FIGS. 1-3. The seat chassis 32 and the occupant-support pad 34 cooperate to provide a seat bottom 36 and a seat back 38 for the inner juvenile seat 14. The seat chassis 32 is formed from rigid materials such as a metal or a rigid plastic to provide structural support for the inner juvenile seat 14. The occupant-support pad 34 is formed from materials that are flexible and/or compressible to increase comfort for the child.

The child restraint 10 may be arranged in either a forward-facing arrangement or a rearward-facing arrangement on the vehicle seat 11 as shown in FIGS. 1 and 2. In the forward-facing arrangement, the shell bottom 26 is arranged to lie on a seat cushion 13 of the vehicle seat 11 and the shell back 28 is arranged to lie on a backrest 15 of the vehicle seat 11. In the rearward-facing arrangement, the child restraint 10 is reoriented relative to the vehicle seat 11 so that the shell back 28 is now arranged to lie on the seat cushion 13 and the shell bottom 26 is arranges to lie on the backrest 15 of the vehicle seat 11.

The inner juvenile seat 14 is configured to move relative to the outer seat-support shell from a first recline orientation when the juvenile seat 14 is arranged in the forward-facing arrangement and a second recline orientation when the juvenile seat 14 is arranged in the rearward-facing arrangement as shown in FIGS. 1 and 2. In the first recline orientation, the seat back 38 of the juvenile seat 14 extends generally parallel to the shell back 28. In the second recline orientation, the seat back 38 extends away from the shell back 28.

The shell back 28 is configured to support the seat back 38 of the inner juvenile seat 14 in both the forward-facing arrangement and the rearward-facing arrangement. The shell back 28 includes a fixed back frame 40 coupled to the shell bottom 26 and a juvenile-seat brace 42 coupled to an upper end of the fixed back frame 40 as shown in FIGS. 1 and 2. The fixed back frame 40 is formed integrally with the shell bottom 26 and remains in a stationary position no matter what recline orientation the inner juvenile seat 14 is arranged in. The juvenile-seat brace 42 is coupled to the fixed back frame 40 for pivotable movement about a horizontal pivot axis 42A between a first seat-support position in the forward-facing arrangement and a second seat-support position in the rearward-facing arrangement. In the first seat-support position, an upper end of the juvenile-seat brace 42 is spaced apart from the juvenile seat 14. In the second seat-support position, the upper end of the juvenile-seat brace 42 engages the seat back 38 of the juvenile seat 14 to block movement of the juvenile seat 14 from the second recline orientation to the first recline orientation.

In some vehicles, the vehicle seats 11 have a seat cushion 13 with a width that is less than a height of its corresponding backrest 15 as shown in FIGS. 1 and 2. When child restraints 10 are reoriented from a forward-facing arrangement to a rearward-facing arrangement, the shell back 28 of the outer seat-support shell 12 may protrude past a forward end of the seat cushion 13. Thus, the child restraint 10 may be difficult to fit in vehicles with small cabin spaces in rear rows. The child restraint 10 in the illustrative embodiment is able to decrease its width in the rearward-facing arrangement and still support the juvenile seat 14 using the juvenile-seat brace 42. The shell back 28 has a first length when the juvenile-seat brace 42 is in the first seat-support position and the shell back 28 has a second length, less than the first length, when the juvenile-seat brace 42 is in the second seat-support position.

The seat back 38 of the juvenile seat 14 is formed to include a brace seat 44 which receives the juvenile-seat brace 42 in the second seat-support position as shown in FIGS. 2 and 3. In the illustrative embodiment, the brace seat 44 is a notch formed into a rear side of the seat back 38. In other embodiments, the brace seat 44 may be a protrusion that extends outward away from the rear side of the seat back 38. The juvenile seat 14 may include multiple brace seats 44 spaced along a length of the seat back 38 so that the juvenile-seat brace 44 can support the juvenile seat at various recline orientations in the rearward-facing arrangement.

The juvenile-seat brace 42 includes a top frame beam 46, a pair of side frame beams 48, 50 coupled to opposing lateral ends of the top frame beam 46, and a hinge lock 52 coupled to a lower end of at least one of the side frame beams 48, 50 and to an upper end of the fixed back frame 40 as shown in FIGS. 2 and 3. The top frame beam 46 is configured to engage the seat back 38 of the juvenile seat 14 when the juvenile-seat brace 42 is in the second seat-support position. The side frame beams 48, 50 extend way from the top frame beam 46 toward the fixed back frame 40. The hinge lock 52 is configured to block selectively movement of the juvenile-seat brace 42 about the horizontal pivot axis 42A between the first and second seat-support positions.

The juvenile-seat brace 42 includes a first hinge lock 52 coupled between the fixed back frame 40 and a first side frame beam 48 and a second hinge lock 54 coupled between the fixed back frame 40 and a second side frame beam 50 as shown in FIGS. 2 and 3. The first hinge lock 52 and the second hinge lock 54 are both substantially similar, and only the first hinge lock 52 is described herein.

The hinge lock 52 includes a lock housing 56 at least partially defining an interior hinge space 58, a lock plate 60 fixed to the fixed back frame 40, and a lock release unit 62 arranged to lie within the interior hinge space 58. The lock housing 56 includes a first housing cap 64 coupled to a first lateral side of the side frame beam 48 and a second housing cap 66 coupled to an opposite second lateral side of the side frame beam 48. The lock release unit 62 is configured to engage the lock plate 60 to block movement of the juvenile-seat brace 42 about the horizontal pivot axis 42A.

Figure 4:
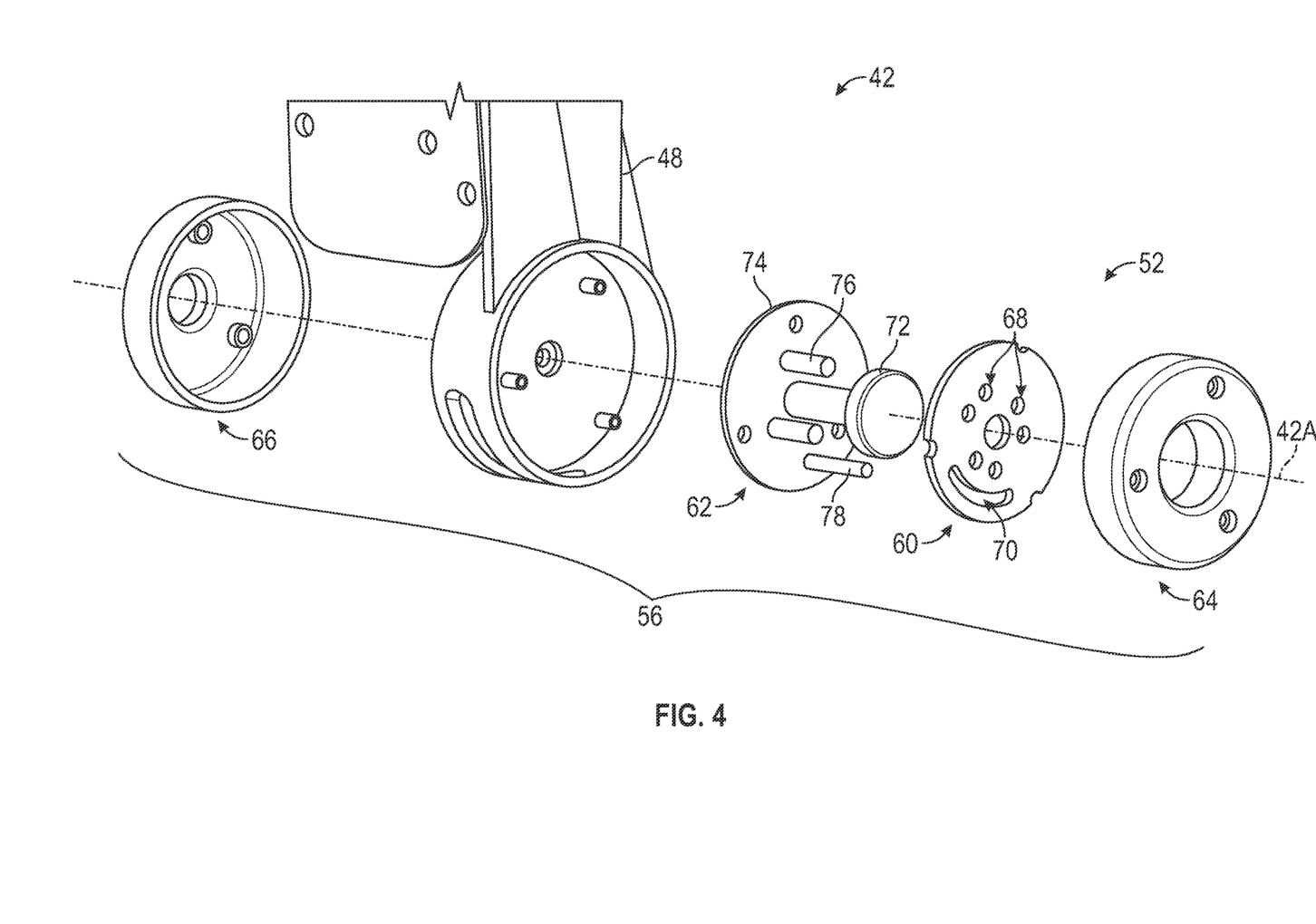
FIG. 4 is an exploded assembly view of one of the hinge locks from FIG. 3 showing that the hinge lock includes a hinge housing, a lock plate coupled to the fixed back frame, and a lock release unit movable within a space formed by the hinge housing to engage and disengage the lock plate.

The lock plate 60 has a circular shape and is formed to include a plurality of apertures 68 guide slot 70 as shown in FIG. 4. The plurality of apertures 68 receive a lock pins 76 included in the lock release unit 62 to block movement of the juvenile seat hinge 42 relative to the fixed back frame 40. The guide slot receives a guide pin 78 to guide pivoting motion of the juvenile seat hinge 42 about the horizontal pivot axis 42A.

Figure 5:
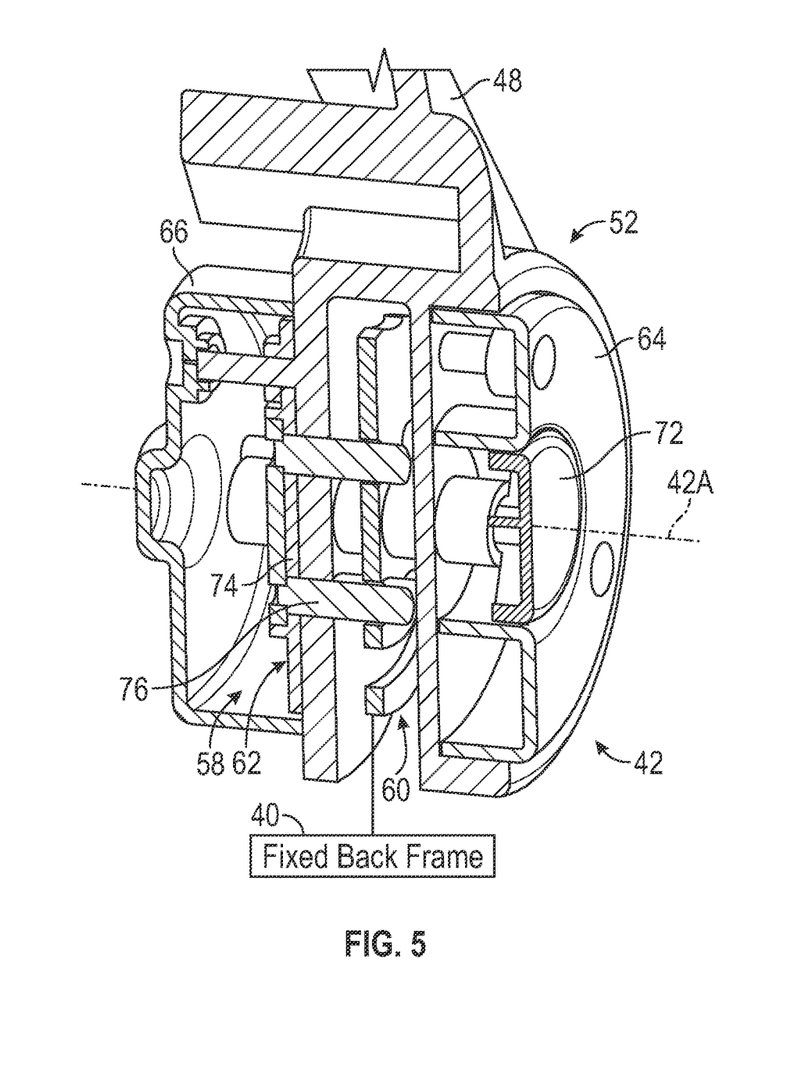
FIG. 5 is a sectional view showing the hinge lock in a locked configuration in which a lock pin included in the lock release unit is received in an aperture formed in the lock plate to block pivotable movement of the juvenile-seat brace about the horizontal pivot axis.
Figure 6:
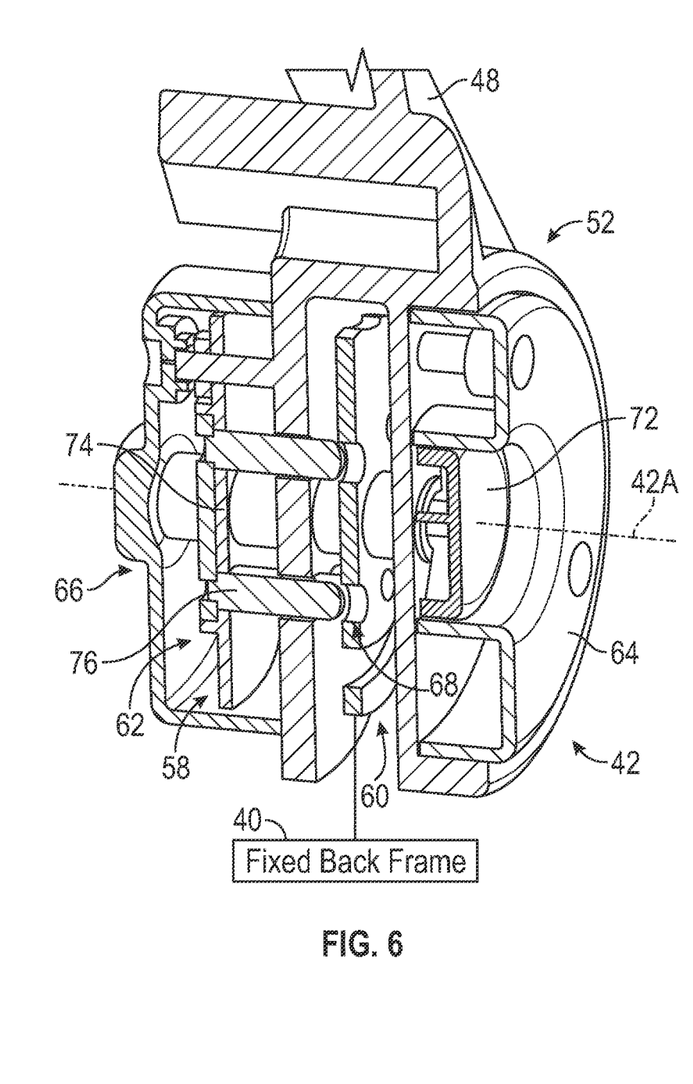
FIG. 6 is a sectional view showing the hinge lock in an unlocked configuration in which the lock pin is removed from the aperture and the juvenile-seat brace is free to pivot relative to the fixed back frame about the horizontal pivot axis.
Figure 7:
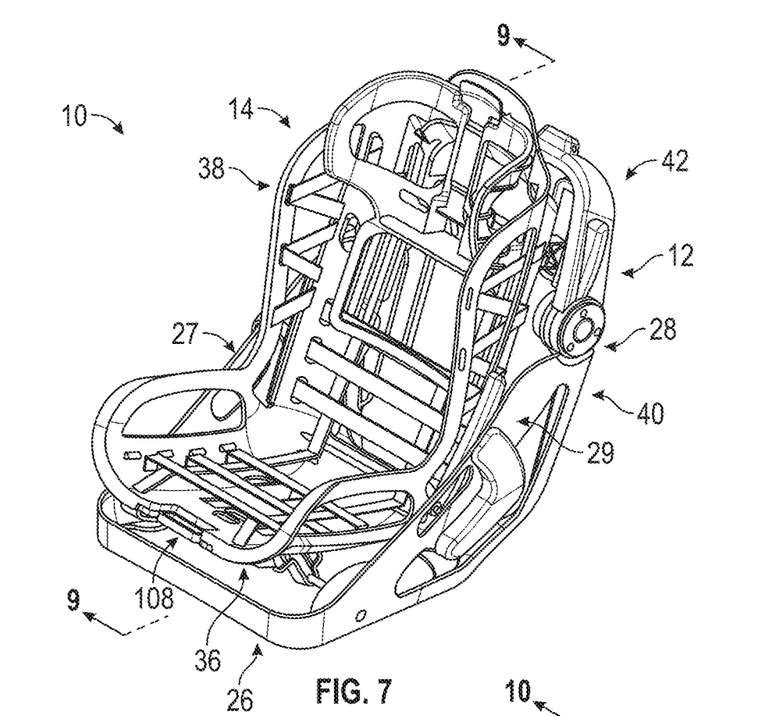
FIG. 7 is a perspective view similar to FIG. 1 showing the child restraint in the forward-facing arrangement and in a first recline orientation.
Figure 8:
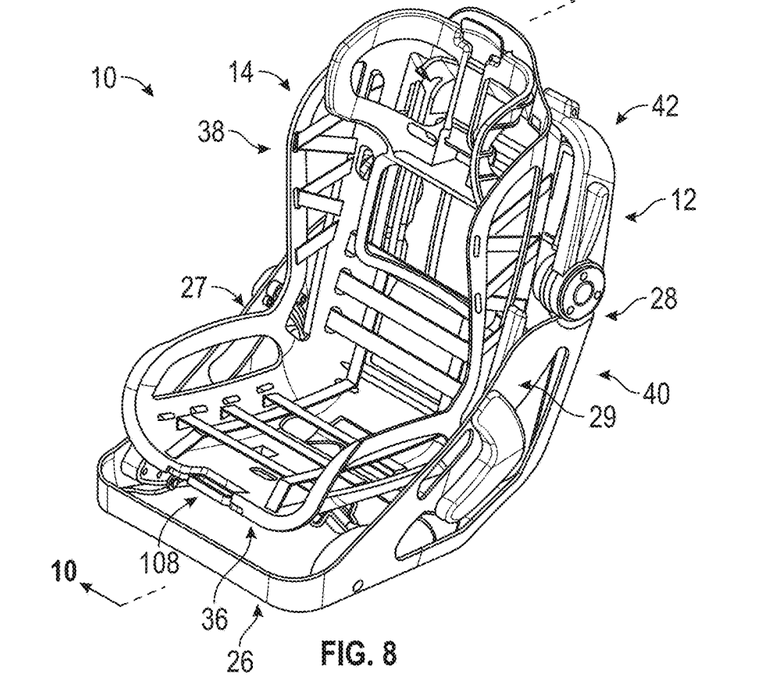
FIG. 8 is a perspective view similar to FIG. 7 showing the child restraint in the forward-facing arrangement and in another recline orientation.

The lock release unit 62 is movable with the top frame beam 46 and the pair of side beams 48, 50 and includes a release button 72, a lock release plate 74, at least one lock pin 76, and at least one guide pin 78 as shown in FIGS. 4-6. The release button 72 is arranged to lie outside of the interior hinge space 58. The lock-release plate 74 is coupled to the release button 72 and is spaced apart from the lock plate 60 axially along the horizontal pivot axis 42A. The at least one lock pin 76 is coupled to the lock-release plate 74 and is arranged to engage the lock plate 60 within one of the apertures 68 to block movement of the juvenile-seat brace 42 about the horizontal pivot axis 42A. The guide pin 78 is arranged to lie in the guide slot 70.

The lock-release unit 62 is slidable within the interior hinge space 58 to change the hinge lock 52 from a locked configuration blocking movement of the juvenile seat hinge 42, as shown in FIG. 5, and an unlocked configuration allowing movement of the juvenile seat hinge 42 as shown in FIG. 6. In the locked configuration, the lock pins 76 extend into apertures 68 formed in the lock plate 60. In the unlocked configuration, the lock pins 76 are removed from the apertures 68 and the juvenile seat hinge 42 is free to pivot about horizontal pivot axis 42A. A user can change the lock release unit 62 from the locked configuration to the unlocked configuration by pressing the release button inwardly toward the lock plate 60. The lock-release unit 62 is normally biased to the locked configuration by a spring, for example.

In illustrative embodiments, the child restraint 10 further includes a plurality of seat anchors 24 configured to secure the inner juvenile seat 14 to the seat-support shell 12. The plurality of seat anchors 24 extend between and interconnect the inner juvenile seat 14 and the seat-support shell 12. Each of the seat anchors 24 are embodied as a rod and allow selective movement of the inner juvenile seat 14 relative to the outer seat-support shell 12.

The seat-support shell 12 is formed to include a plurality of guide slots 80, 82, 88, 90 and a plurality of recline openings 84, 86 which receive the plurality of seat anchors 24 and allow the inner juvenile seat 14 to recline relative to the seat-support shell 12 as shown in FIGS. 7-10. A first seat anchor 100 is arranged to lie is a first pair of guide slots 80, 82 formed in opposing lateral sides of the shell back 28. A second seat anchor 102 is arranged to lie in opposing recline apertures 84, 86 formed in at least one of the shell bottom 26 and the side rails 27, 29. A third seat anchor 104 is arranged to lie in a second pair of guide slots 88, 90 formed in opposing lateral sides of the side rails 27, 29 between the first pair of guide slots 80, 82 and the plurality of recline openings 84, 86.

The second seat anchor 102 is movable relative to the inner juvenile seat 14 by a recline actuator handle 108 mounted on a front end of the juvenile seat 14 as shown in FIGS. 7-10. The second seat anchor 102 is configured to extend into one of the plurality of recline openings 84, 86 to block movement of the inner juvenile seat 14 relative to the seat-support shell 12. The recline actuator handle 108 may be pulled forward by a user to withdraw the second seat anchor 102 from the recline openings 84, 86. The first and third seat anchors 100, 104 are slidable through their respective guide slots 80, 82, 88, 90 when the second seat anchor 102 is withdrawn from the recline openings 84, 86 to change the recline orientation of the inner juvenile seat 14 relative to the seat-support shell 12.

Figure 9:
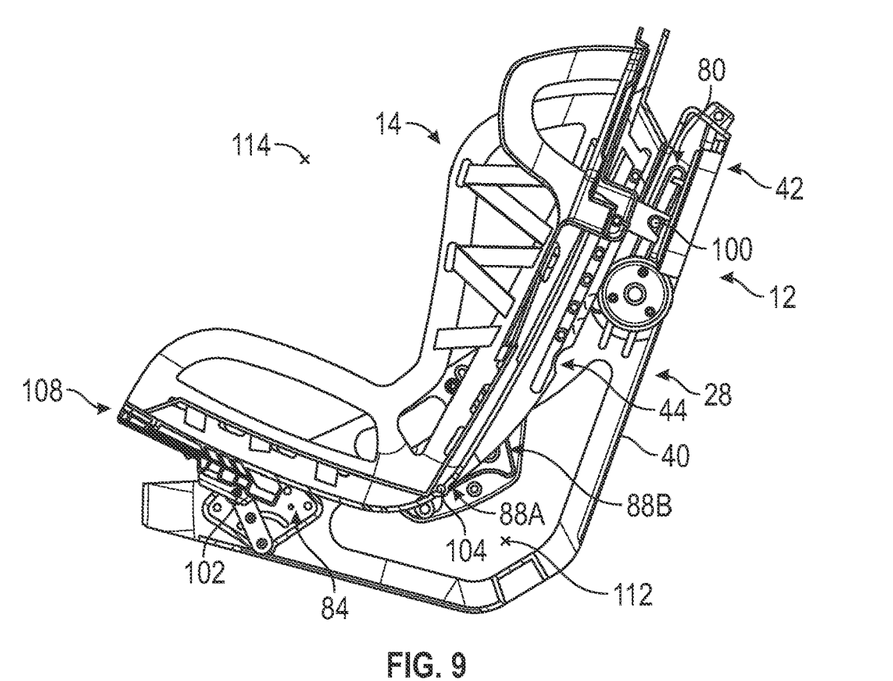
FIG. 9 is a sectional view taken along line 9-9 in FIG. 7.
Figure 10:
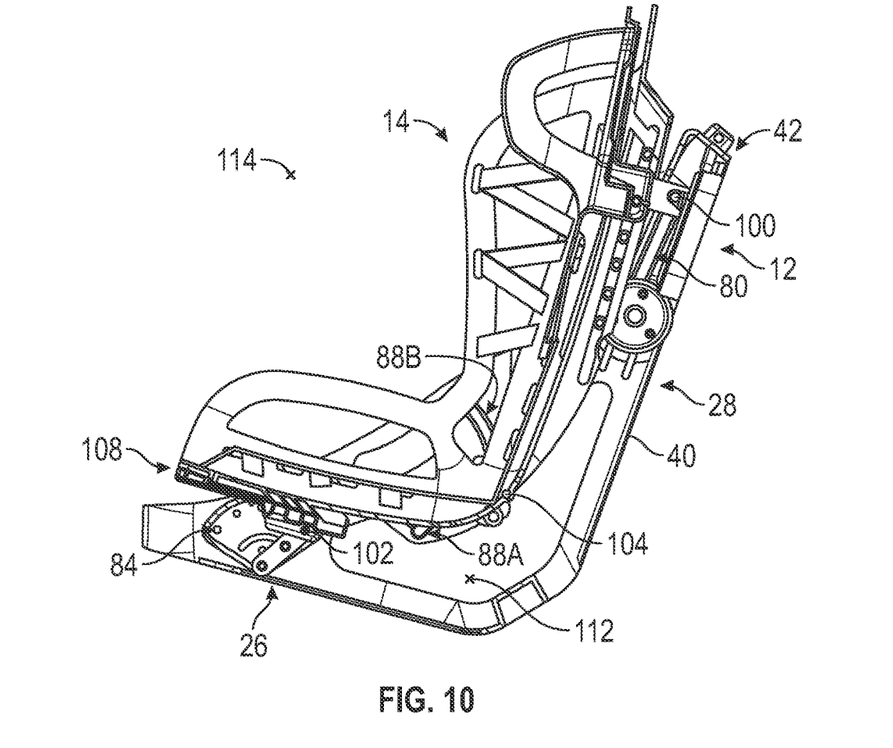
FIG. 10 is a sectional view taken along line 10-10 in FIG. 8.
Figure 11:
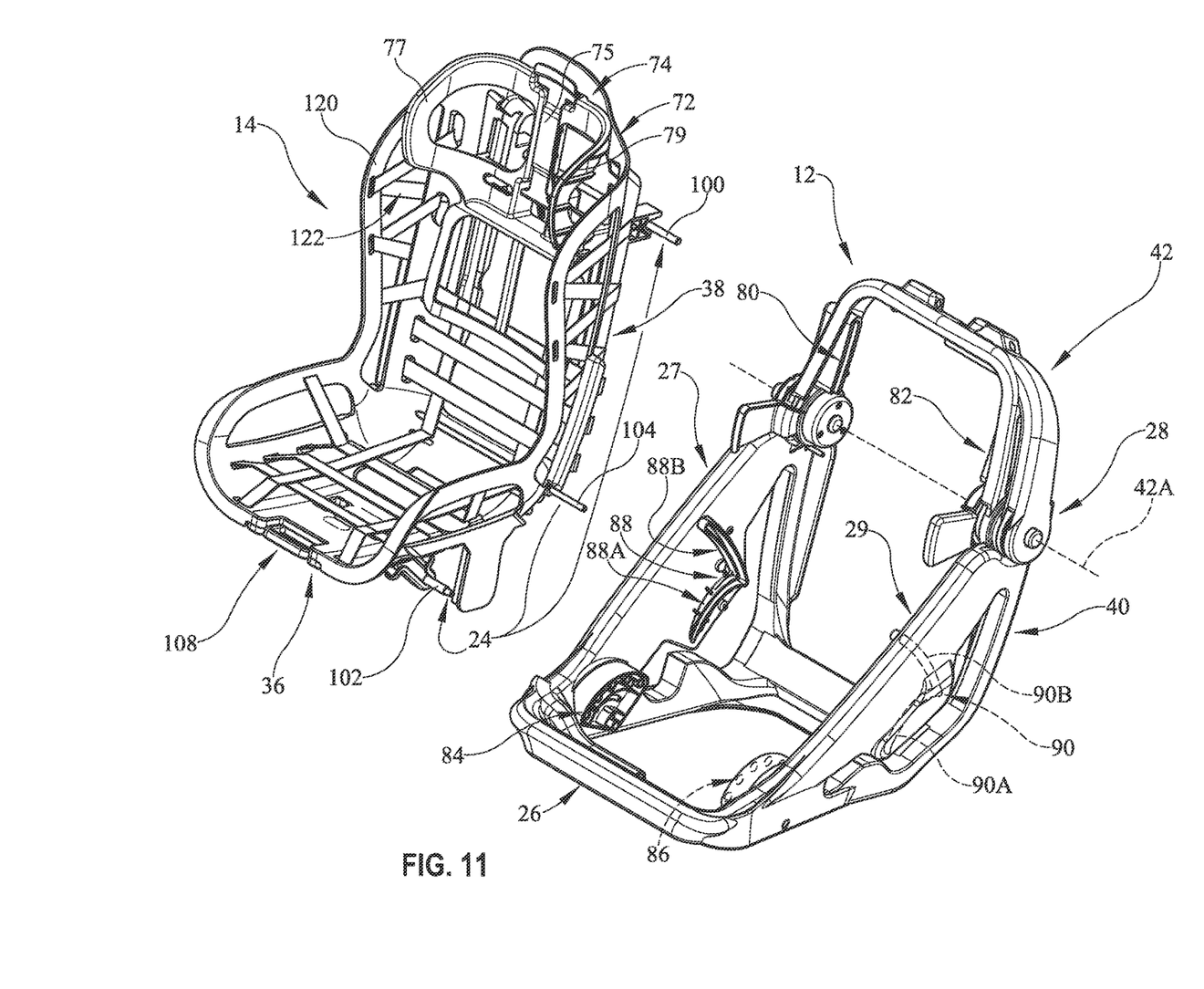
FIG. 11 is an exploded assembly view showing the juvenile seat separated from the outer seat-support shell to expose a plurality of seat anchors that attach the juvenile seat to the outer seat-support shell and a plurality of guide slots and apertures formed in the outer seat-support shell which receive the plurality of seat anchors.

The second pair of guide slots 88, 90 includes a forward-facing recline segment 88A, 90A and a rearward-facing recline segment 88B, 90B as shown in FIG. 11. The third seat anchor 104 is located in the forward-facing recline segments 88A, 90A when the child restraint 10 is in the forward-facing arrangement. The juvenile seat 14 is configured to pivot about a first forward-facing recline axis 112 and a second forward-facing recline axis 114 as the juvenile seat 14 changes recline orientation in the forward-facing arrangement. The first forward-facing recline axis 112 is at a centroid of the forward-facing segments 88A, 90A when the juvenile seat 14 is viewed from the side as shown in FIGS. 9 and 10. The second forward-facing recline axis 114 is at a centroid of the first guide slots 80, 82 when the juvenile seat 14 is viewed from the side. The third seat anchor 104 is located in the rearward-facing recline segments 88B, 90B when the child restraint 10 is in the rearward-facing arrangement. The inner juvenile seat 14 is detachable from the first seat anchor 100 by releasing attachment hooks 110 from the first seat anchor 100 so that the third seat anchor 104 is free to travel through the rearward-facing recline segments 88B, 90B. The juvenile seat is configured to pivot about the second seat anchor 102 when the juvenile seat 14 changes recline orientation in the rearward-facing arrangement. The second seat anchor 102 is aligned with a centroid of the rearward-facing segments 88B, 90B when the juvenile seat 14 is in the rearward-facing arrangement.

The first seat anchor 100 is releasable from the inner juvenile seat 14 so that the seat back 38 can separate from the shell back 28 when transitioning from the forward-facing arrangement to the rearward-facing arrangement. The seat back 38 then reengages the shell back 28 via the juvenile-seat brace 42 without engaging the first seat anchor 100. Thus, the juvenile seat 14 is engaged with the first seat anchor 100 in the forward-facing arrangement and is disengaged from the first seat anchor 100 in the rearward-facing arrangement.

The invention claimed is:

1. A child restraint comprising an outer seat-support shell adapted to rest on a vehicle seat and to be secured to the vehicle seat for transportation in a vehicle, the outer seat-support shell formed to include a seat receiving space and including a shell bottom and a shell back coupled to the shell bottom, and an inner juvenile seat at least partially received in the seat receiving space and configured to provide a child-receiving space sized to receive a child therein, the inner juvenile seat is coupled to the outer seat-support shell so as to be supported in spaced apart relation to the vehicle seat and configured to move relative to the outer seat-support shell to change a recline orientation of the inner juvenile seat relative to the outer seat-support shell from a first recline orientation when the juvenile seat is arranged in a forward-facing arrangement and a second recline orientation when the juvenile seat is arranged in a rearward-facing arrangement, wherein the shell back includes a fixed back frame coupled to the shell bottom and a juvenile-seat brace coupled to an upper end of the fixed back frame for pivotable movement about horizontal pivot axis between a first seat-support position in which an upper end of the juvenile seat brace is spaced apart from the juvenile seat when the juvenile seat is arranged in the forward-facing arrangement, and a second seat-support position in which an upper end of the juvenile-seat brace engages the juvenile seat when the juvenile seat is arranged in the rearward-facing arrangement.

2. The child restraint of claim 1, wherein the shell back has a first length when the juvenile-seat brace is in the first seat-support position and the shell back has a second length, less than the first length, when the juvenile-seat brace is in the second seat-support position.

3. The child restraint of claim 1, wherein the juvenile seat includes a seat bottom and a seat back arranged to extend upwardly away from the seat bottom, and wherein the seat back is formed to include a brace seat which receives the juvenile-seat brace in the second seat-support position.

4. The child restraint of claim 3, wherein the brace seat is a notch.

5. The child restraint of claim 1, wherein the juvenile-seat brace includes a top frame beam, a pair of side frame beams coupled to opposing lateral ends of the top frame beam, and a hinge lock coupled to a lower end of at least one of the side frame beams and to an upper end of the fixed back frame to block selectively movement of the juvenile-seat brace about the horizontal pivot axis.

6. The child restraint of claim 5, wherein the hinge lock includes a first hinge lock coupled between the fixed back frame and a first side frame beam included in the pair of side frame beams and a second hinge lock coupled between the fixed back frame and a second side frame beam included in the pair of side frame beams opposite the first side frame beam.

7. The child restraint of claim 6, wherein each of the hinge locks includes a lock housing at least partially defining an interior hinge space, a lock plate fixed to the fixed back frame, and a lock release unit arranged to lie within the interior hinge space and movable with the top frame beam and the pair of side beams and configured to engage the lock plate to block movement of the juvenile-seat brace about the horizontal pivot axis.

8. The child restraint of claim 7, wherein the lock release unit includes a release button arranged to lie at least partially outside of the interior hinge space, a lock-release plate coupled to the release button and spaced apart from the lock plate axially along the horizontal pivot axis, and at least one lock pin coupled to the lock-release plate and arranged to engage the lock plate to block movement of the juvenile-seat brace about the horizontal pivot axis.

9. The child restraint of claim 8, wherein the at least one lock pin is arranged to extend into a first opening formed in the lock plate when the juvenile seat brace is in the first seat support position to block rotation about the horizontal pivot axis and the at least one lock pin is arranged to extend into a second opening formed in the lock plate spaced circumferentially from the first opening about the horizontal pivot axis to block rotation about the horizontal pivot axis.

10. A child restraint comprising:
an outer seat-support shell adapted to rest on a vehicle seat and to be secured to the vehicle seat for transportation in a vehicle, the outer seat-support shell providing a seat receiving space,
an inner juvenile seat at least partially received in the seat receiving space and configured to provide a child-receiving space sized to receive a child therein, the inner juvenile seat is coupled to the outer seat-support shell so as to be supported in spaced apart relation to the vehicle seat and configured to move relative to the outer seat-support shell to change a recline orientation of the inner juvenile seat relative to the outer seat-support shell, and
a plurality of anchors configured to couple the inner juvenile seat to the seat-support shell, and the seat-support shell is formed to include a plurality of guide slots and a plurality of recline openings which receive the plurality of seat anchors and allow the inner juvenile seat to recline relative to the seat-support shell,
wherein the seat-support shell includes a shell bottom and a shell back arranged to extend upwardly away from the shell bottom, and the inner juvenile seat includes a seat bottom coupled to the shell bottom and a seat back coupled to the shell back, and
wherein the plurality of anchors includes a first seat anchor extending between and interconnecting the shell back and the seat back, a second seat anchor extending between and interconnecting the shell bottom and the seat bottom, and a third seat anchor located between the first and second seat anchors and extending between and interconnecting the seat-support shell and the inner juvenile seat,
wherein the first seat anchor is arranged to lie in a first pair of guide slots formed in opposing lateral sides of the shell back, the second seat anchor is arranged to lie in opposing recline apertures formed in the shell bottom, and the third seat anchor is arranged to lie in a second pair of guide slots formed in side rails of the seat-support shell between the first pair of guide slots and the plurality of recline openings.

11. The child restraint of claim 10, wherein the second seat anchor includes retractable pins movable relative to the inner juvenile seat by a recline actuator handle mounted on a front end of the juvenile seat between a first position in which the retractable pins extend into one of the plurality of recline openings to block movement of the inner juvenile seat relative to the seat-support shell and a second position after the recline actuator handle has been pulled forward by a user in which the retractable pins are withdrawn from the recline openings and the inner juvenile seat is free to change recline orientations relative to the seat-support shell.

12. The child restraint of claim 11, wherein the first and third seat anchors are slidable through their respective guide slots when the second seat anchor 102 is in the second position to change the recline orientation of the inner juvenile seat relative to the seat-support shell.

13. The child restraint of claim 12, wherein the second pair of guide slots includes a forward-facing recline segment and a rearward-facing recline segment, and the third seat anchor is located in the forward-facing recline segments when the child restraint is in the forward-facing arrangement, and the third seat anchor is located in the rearward-facing recline segments when the child restraint is in the rearward-facing arrangement.

14. The child restraint of claim 13, wherein the inner juvenile seat is configured to pivot about a recline axis to change the recline orientation of the inner juvenile seat relative to the seat-support shell in the forward-facing arrangement and the inner juvenile seat is configured to pivot about the second seat anchor, spaced apart from the recline axis, to change the recline orientation of the inner juvenile seat relative to the seat-support shell in the rearward-facing arrangement.

15. A child restraint comprising
an outer seat-support shell adapted to rest on a vehicle seat and to be secured to the vehicle seat for transportation in a vehicle, the outer seat-support shell formed to include a seat receiving space and including a shell bottom and a shell back arranged to extend upwardly away from the shell bottom, and an inner juvenile seat at least partially received in the seat receiving space and configured to provide a child-receiving space sized to receive a child therein, the inner juvenile seat is coupled to the outer seat-support shell so as to be supported in spaced apart relation to the vehicle seat, wherein the shell back includes a fixed back frame coupled to the shell bottom and a juvenile-seat brace coupled to an upper end of the fixed back frame for pivotable movement about horizontal pivot axis between first seat-support position in which an upper end of the juvenile seat brace is spaced apart from the juvenile seat, and a second seat-support position in which an upper end of the juvenile-seat brace engages the juvenile seat.

16. The child restraint of claim 15, wherein the shell back has a first length when the juvenile-seat brace is in the first seat-support position and the shell back has a second length, less than the first length, when the juvenile-seat brace is in the second seat-support position.

17. The child restraint of claim 15, wherein the juvenile seat includes a seat bottom and a seat back arranged to extend upwardly away from the seat bottom, and wherein the seat back is formed to include a brace seat which receives the juvenile-seat brace in the second seat-support position.

18. The child restraint of claim 15, wherein the juvenile-seat brace includes a top frame beam, a pair of side frame beams coupled to opposing lateral ends of the top frame beam, and a hinge lock coupled to a lower end of at least one of the side frame beams and to an upper end of the fixed back frame to block selectively movement of the juvenile-seat brace about the horizontal pivot axis.

19. The child restraint of claim 5, wherein the hinge lock includes a first hinge lock coupled between the fixed back frame and a first side frame beam included in the pair of side frame beams and a second hinge lock coupled between the fixed back frame and a second side frame beam included in the pair of side frame beams opposite the first side frame beam, wherein each of the hinge locks includes a lock housing at least partially defining an interior hinge space, a lock plate fixed to the fixed back frame, and a lock release unit arranged to lie within the interior hinge space and movable with the top frame beam and the pair of side beams and configured to engage the lock plate to block movement of the juvenile-seat brace about the horizontal pivot axis, and wherein the lock release unit includes a release button arranged to lie at least partially outside of the interior hinge space, a lock-release plate coupled to the release button and spaced apart from the lock plate axially along the horizontal pivot axis, and at least one lock pin coupled to the lock-release plate and arranged to engage the lock plate to block movement of the juvenile-seat brace about the horizontal pivot axis.

* * * * *